US012396616B2

(12) United States Patent
Ryan

(10) Patent No.: US 12,396,616 B2
(45) Date of Patent: Aug. 26, 2025

(54) STRAW HOLDER ASSEMBLY FOR A DISHWASHER APPLIANCE

(71) Applicant: Haier US Appliance Solutions, Inc., Wilmington, DE (US)

(72) Inventor: Justin Daniel Ryan, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 151 days.

(21) Appl. No.: 18/490,944

(22) Filed: Oct. 20, 2023

(65) Prior Publication Data

US 2025/0127375 A1 Apr. 24, 2025

(51) Int. Cl.

| | |
|---|---|
| ***A47L 15/16*** | (2006.01) |
| ***A47L 15/14*** | (2006.01) |
| ***A47L 15/42*** | (2006.01) |
| ***A47L 15/50*** | (2006.01) |
| ***B08B 9/032*** | (2006.01) |

(52) U.S. Cl.

CPC ............ *A47L 15/503* (2013.01); *A47L 15/14* (2013.01); *A47L 15/4214* (2013.01); *A47L 15/4278* (2013.01); *A47L 15/507* (2013.01); *B08B 9/0323* (2013.01); *B08B 2209/032* (2013.01)

(58) Field of Classification Search

CPC ........................................................ A47L 15/16

See application file for complete search history.

(56) References Cited

U.S. PATENT DOCUMENTS

| | | | |
|---|---|---|---|
| 8,312,887 | B2 | 11/2012 | Dunn et al. |
| 11,589,729 | B2 | 2/2023 | Ohayon et al. |
| 2014/0014605 | A1 | 1/2014 | Kilgore et al. |
| 2020/0237181 | A1 | 7/2020 | Campbell |

FOREIGN PATENT DOCUMENTS

| | | | |
|---|---|---|---|
| DE | 29818725 | U1 | 12/1998 |
| DE | 202019104788 | U1 | 9/2019 |

*Primary Examiner* — Jason Y Ko

(74) *Attorney, Agent, or Firm* — Dority & Manning, P.A.

(57) ABSTRACT

A dishwasher appliance and a wash assembly for tubular articles in a dishwasher includes a base forming a conduit, a nozzle fluidly coupled to the conduit and configured to fit within a reusable straw such that the nozzle provides a dedicated flow of wash fluid to the inside of the straw. The wash assembly includes a retainer system to removably secure the straw to the wash assembly. The retainer system may include a resilient clip secured to the nozzle and deformable to accept and release the straw.

20 Claims, 4 Drawing Sheets

STRAW HOLDER ASSEMBLY FOR A DISHWASHER APPLIANCE

FIELD OF THE INVENTION

The present disclosure relates generally to dishwasher appliances, and more particularly to a washing system for straws within a dishwasher.

BACKGROUND OF THE INVENTION

Dishwasher appliances generally include a tub that defines a wash chamber and a rack assembly for the receipt of articles for washing. Some dishwasher appliances include a basket for silverware and similar items, with the basket attached to a rack assembly. Generally, the rack assembly and the silverware basket can accommodate most articles selected for washing in a dishwasher.

Recently, durable, reusable straws have become popular and are often washed in a dishwasher. However, the relatively long, tubular configuration of the reusable straws do not lend themselves to adequate cleaning in either a rack or the silverware basket. Typical racks cannot secure the straws in position to sufficiently clean the inner passage. The perforations in the bottom of typical silverware baskets are too large to prevent many straws from passing through the bottom of the basket and interfering with operation of the appliance. Perforations that may sufficiently contain the straws generally do not provide reliable or consistent wash water contact with the inner passage to properly clean the straws.

Accordingly, a dishwasher appliance including a straw holder that addresses the above-mentioned issues would be beneficial.

BRIEF DESCRIPTION OF THE INVENTION

Aspects and advantages of the invention will be set forth in part in the following description, may be apparent from the description, or may be learned through practice of the invention.

In one exemplary aspect, a dishwasher appliance defining a vertical direction, a lateral direction, and a transverse direction, the vertical, lateral, and transverse directions being mutually perpendicular is presented. The dishwasher appliance comprises a tub defining a wash chamber, a rack mounted within the wash chamber and configured for receipt of articles for cleaning, and a wash assembly for retaining a tubular article having an inner passage and introducing a stream of wash fluid to said inner passage. The wash assembly comprises a base defining a conduit, the conduit having a first end and a second end, a nozzle fluidly coupled to the second end of the conduit, the nozzle configured to be received within the inner passage, and a retainer system to removably secure the tubular article to the wash assembly, and wherein the conduit provides a pressurized flow of a wash fluid to the nozzle.

In another exemplary aspect, a wash assembly for retaining a tubular article having an inner passage and introducing a stream of wash fluid to said inner passage is presented. The wash assembly comprises a base defining a conduit, the conduit having a first end and a second end, a nozzle fluidly coupled to the second end of the conduit, the nozzle configured to be received within the inner passage, and a retainer system to removably secure the tubular article to the wash assembly, and wherein the conduit is adapted to provide a pressurized flow of a wash fluid to the nozzle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
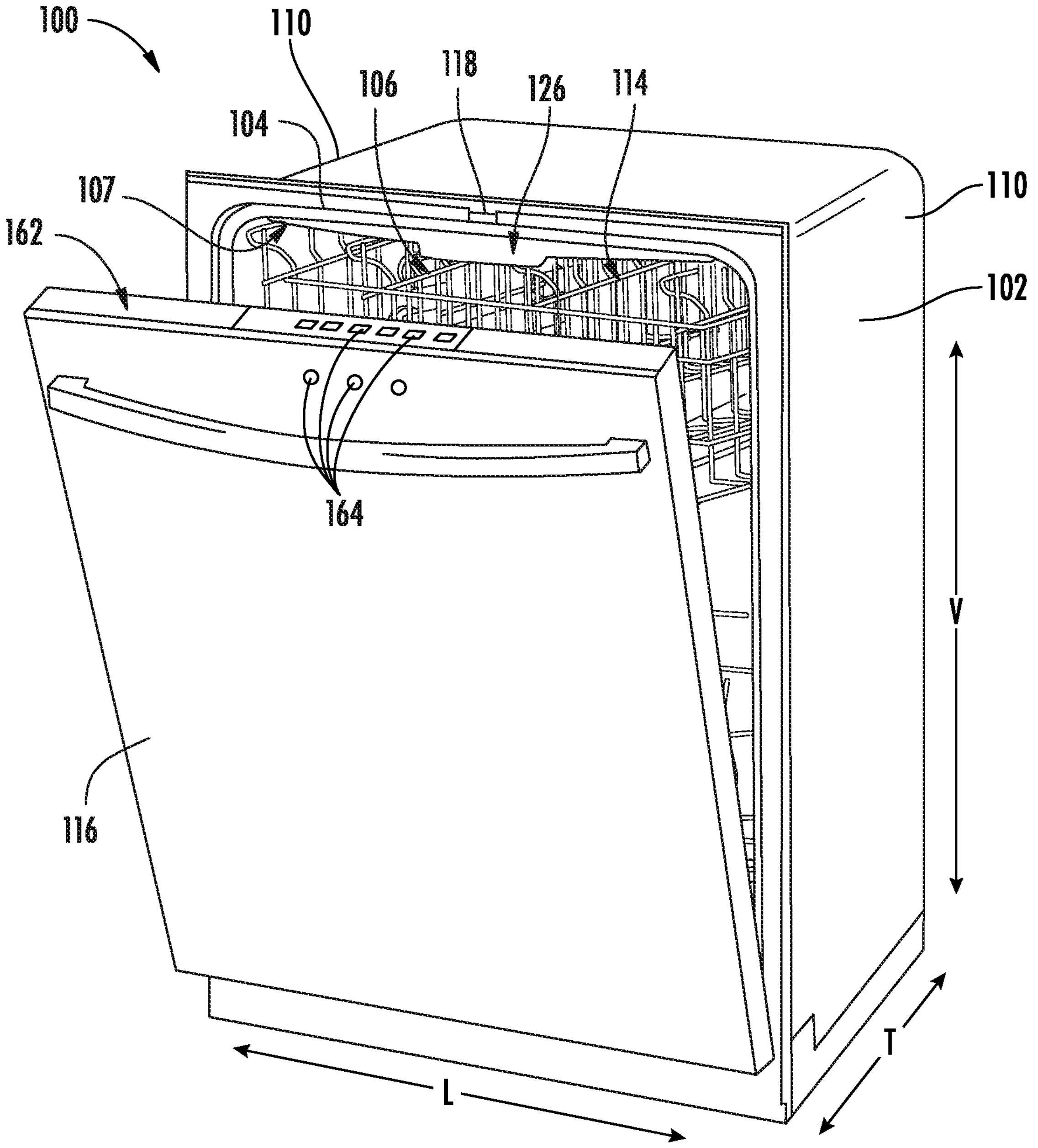
FIG. 1 provides a perspective view of an exemplary embodiment of a dishwashing appliance of the present disclosure with a door in a partially open position.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms “first,” “second,” and “third” may be used interchangeably to distinguish one component from another and are not intended to signify location or importance of the individual components. The terms “includes” and “including” are intended to be inclusive in a manner similar to the term “comprising.” Similarly, the term “or” is generally intended to be inclusive (i.e., “A or B” is intended to mean “A or B or both”). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms “a,” “an,” and “the” include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
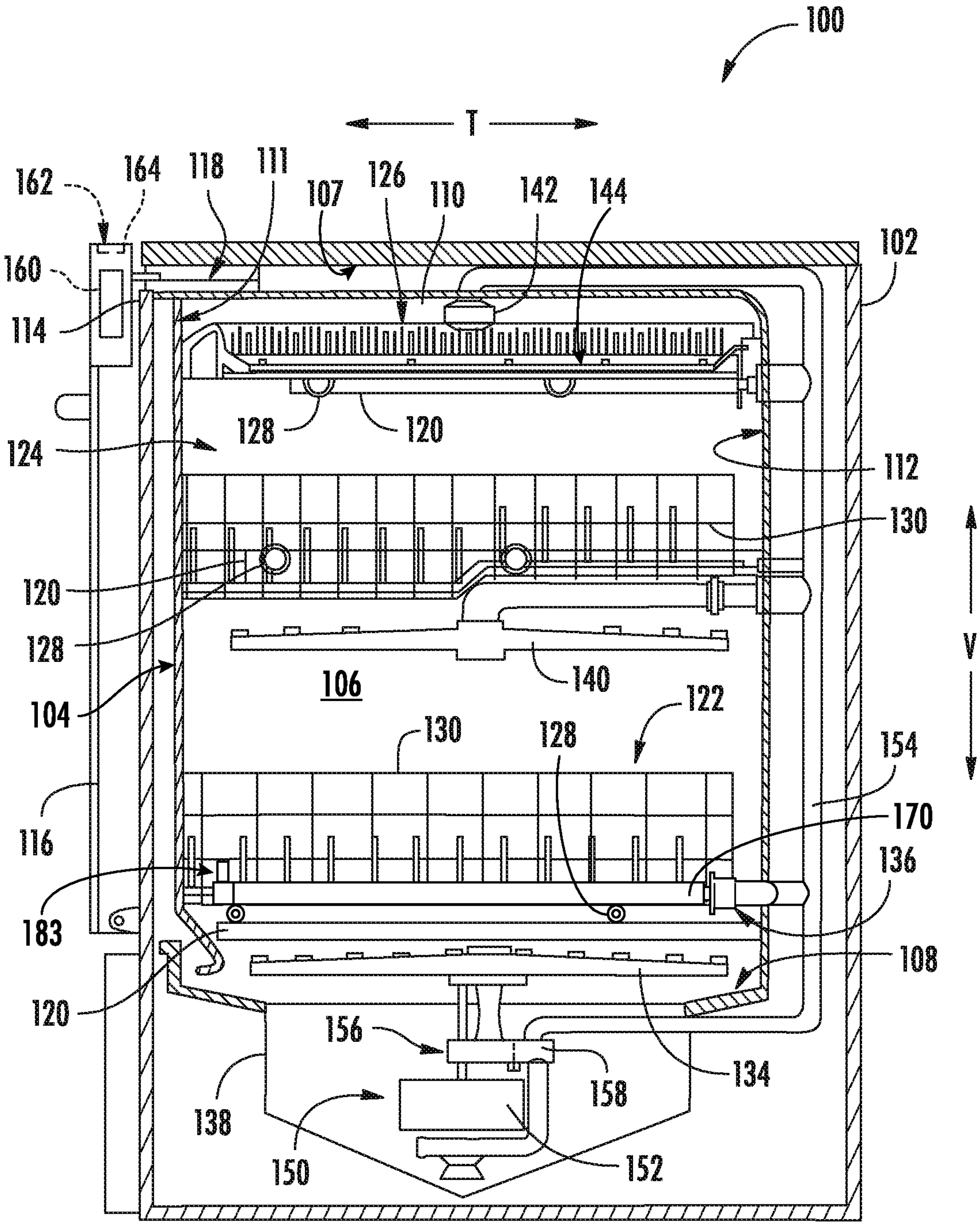
FIG. 2 provides a side, cross-sectional view of the exemplary dishwashing appliance of FIG. 1.

Turning to the figures, FIGS. 1 and 2 depict an exemplary domestic dishwasher or dishwashing appliance 100 that may be configured in accordance with aspects of the present disclosure. For the particular embodiment of FIGS. 1 and 2, the dishwasher 100 includes a cabinet 102 (FIG. 2) having a tub 104 therein that defines a wash chamber 106. As shown in FIG. 2, tub 104 extends between a top 107 and a bottom 108 along a vertical direction V, between a pair of side walls 110 along a lateral direction L, and between a front side 111 and a rear side 112 along a transverse direction T. Each of the vertical direction V, lateral direction L, and transverse direction T are mutually perpendicular to one another.

The tub 104 includes a front opening 114 and a door 116 hinged at its bottom for movement between a normally closed vertical position (shown in FIG. 2), wherein the wash chamber 106 is sealed shut for washing operation, and a horizontal open position for loading and unloading of articles from the dishwasher 100. According to exemplary embodiments, dishwasher 100 further includes a door closure mechanism or assembly 118 that is used to lock and unlock door 116 for accessing and sealing wash chamber 106.

As best illustrated in FIG. 2, tub side walls 110 accommodate one or more rack assemblies (three shown). More specifically, guide rails 120 may be mounted to side walls 110 for supporting a lower rack assembly 122, a middle rack assembly 124, and an upper rack assembly 126 for sliding motion. As illustrated, upper rack assembly 126 is positioned at a top portion of wash chamber 106 above middle rack assembly 124, which is positioned above lower rack assembly 122 along the vertical direction V. Each rack assembly 122, 124, 126 is adapted for sliding movement on the guide rails 120 between an extended loading position (second position, not shown) in which the rack is positioned at least partially outside the wash chamber 106, and a retracted position (first position as shown in FIGS. 1 and 2) in which the rack is located inside the wash chamber 106. This is facilitated, for example, by rollers 128 mounted onto rack assemblies 122, 124, 126, respectively. Although guide rails 120 and rollers 128 are illustrated herein as facilitating movement of the respective rack assemblies 122, 124, 126, it should be appreciated that any suitable sliding mechanism or member may be used according to alternative embodiments.

Some, or all, of the rack assemblies 122, 124, 126 are fabricated into lattice structures including a plurality of wires or elongated members 130 (for clarity of illustration, not all elongated members making up rack assemblies 122, 124, 126 are shown in FIG. 2). In this regard, rack assemblies 122, 124, 126 are generally configured for supporting articles within wash chamber 106 while allowing a flow of wash fluid to reach and impinge on those articles, e.g., during a cleaning or rinsing cycle. According to another exemplary embodiment, a silverware basket (not shown) may be removably attached to a rack assembly, e.g., lower rack assembly 122, for placement of silverware, utensils, and the like, that are otherwise too small to be accommodated by rack 122.

Dishwasher 100 further includes a plurality of spray assemblies for urging a flow of water or wash fluid onto the articles placed within wash chamber 106. More specifically, as illustrated in FIG. 2, dishwasher 100 includes a lower spray arm assembly 134 disposed in a lower region 136 of wash chamber 106 and above a sump 138 so as to rotate in relatively close proximity to lower rack assembly 122. Similarly, a mid-level spray arm assembly 140 is located in an upper region of wash chamber 106 and may be located below and in close proximity to middle rack assembly 124. In this regard, mid-level spray arm assembly 140 may generally be configured for urging a flow of wash fluid up through middle rack assembly 124 and upper rack assembly 126. Additionally, an upper spray assembly 142 may be located above upper rack assembly 126 along the vertical direction V. In this manner, upper spray assembly 142 may be configured for urging and/or cascading a flow of wash fluid downward over rack assemblies 122, 124, and 126. As further illustrated in FIG. 2, upper rack assembly 126 may further define an integral spray manifold 144, which is generally configured for urging a flow of wash fluid substantially upward along the vertical direction V through upper rack assembly 126.

The various spray assemblies and manifolds described herein may be part of a fluid distribution system or fluid circulation assembly 150 for circulating water and wash fluid in the tub 104. More specifically, fluid circulation assembly 150 includes a pump 152 for circulating water and wash fluid (e.g., detergent, water, and/or rinse aid) in the tub 104. Pump 152 may be located within sump 138 or within a machinery compartment located below sump 138 of tub 104, as generally recognized in the art. Fluid circulation assembly 150 may include one or more fluid conduits or circulation piping for directing water and/or wash fluid from pump 152 to the various spray assemblies and manifolds. For example, as illustrated in FIG. 2, a primary supply conduit 154 may extend from pump 152, along rear 112 of tub 104 along the vertical direction V to supply wash fluid throughout wash chamber 106.

As illustrated, primary supply conduit 154 is used to supply pressurized wash fluid to one or more spray assemblies, e.g., to mid-level spray arm assembly 140 and upper spray assembly 142. However, it should be appreciated that according to alternative embodiments, any other suitable plumbing configuration may be used to supply pressurized wash fluid throughout the various spray manifolds and assemblies described herein. For example, according to another exemplary embodiment, primary supply conduit 154 could be used to provide pressurized wash fluid to mid-level spray arm assembly 140 and a dedicated secondary supply conduit (not shown) could be utilized to provide pressurized wash fluid to upper spray assembly 142. Other plumbing configurations may be used for providing pressurized wash fluid to the various spray devices and manifolds at any location within dishwasher appliance 100.

According to an embodiment, primary supply conduit 154 may also supply a pressurized flow of wash fluid to base 170 (FIG. 2), the base 170 affixed to a rack, as illustrated lower rack assembly 122. The base 170 defines a network of one or more passageways 178 formed internally to the base 170 and generally extending from first end 172 to second end 174. The primary supply conduit 154 may be in fluid communication with a first coupling 176 positioned at the first end 172 when the rack assembly 122 is fully received within the wash chamber 106. Primary supply conduit 154 may include a second coupling 180 configured to fluidly join with first coupling 176. The first and second couplings 176, 180 may provide a separable fluid connection to support the rack 122 sliding out of the wash chamber 106 (i.e., second position) and reestablishing the fluid connection when the rack 122 is returned to the first position. Accordingly, the first end 172 of the passageway 178 is in fluid communication with the source of the pressurized flow of wash fluid at least when the rack 122 is in the first position.

Each spray arm assembly 134, 140, 142, integral spray manifold 144, or other spray device may include an arrangement of discharge ports or orifices for directing wash fluid received from pump 152 onto dishes or other articles located in wash chamber 106. The arrangement of the discharge ports, also referred to as jets, apertures, or orifices, may provide a rotational force by virtue of pressurized wash fluid flowing through the discharge ports. Alternatively, spray arm assemblies 134, 140, 142 may be motor-driven, or may operate using any other suitable drive mechanism. Spray manifolds and assemblies may also be stationary. The resultant movement of the spray arm assemblies 134, 140, 142 and the spray from fixed manifolds provides coverage of dishes and other dishwasher contents with a washing spray. Other configurations of spray assemblies may be used as well. For example, dishwasher 100 may have additional spray assemblies for cleaning silverware, for scouring casserole dishes, for spraying pots and pans, for cleaning bottles, etc.

Figure 3:
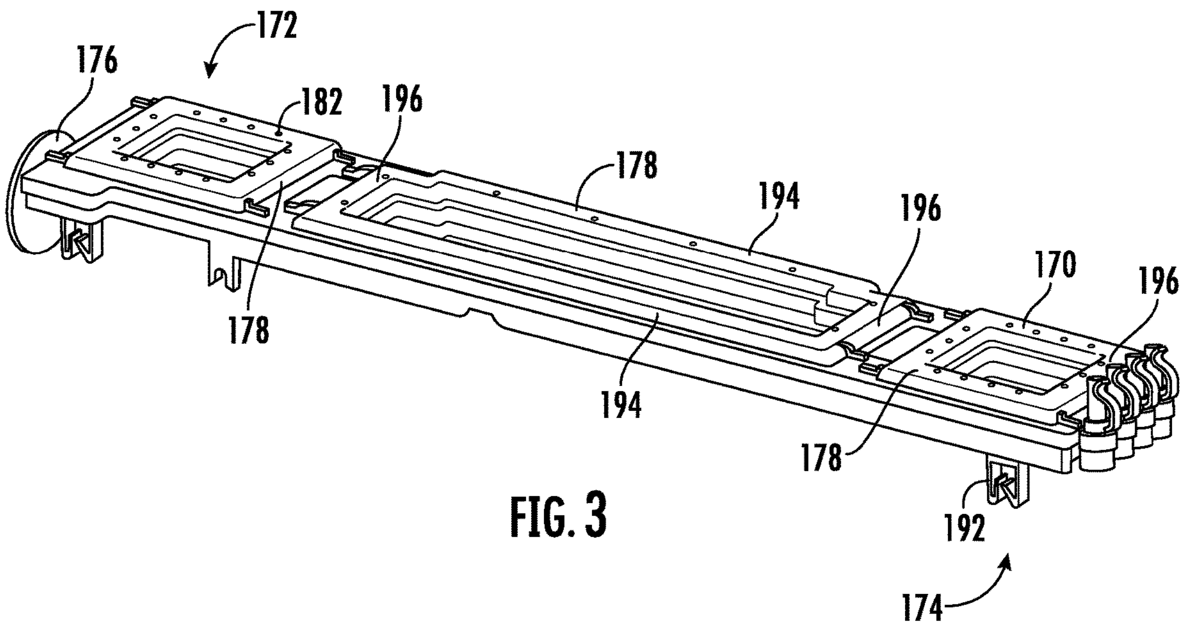
FIG. 3 provides a perspective view of a base in accordance with an embodiment of the present disclosure.
Figure 4:
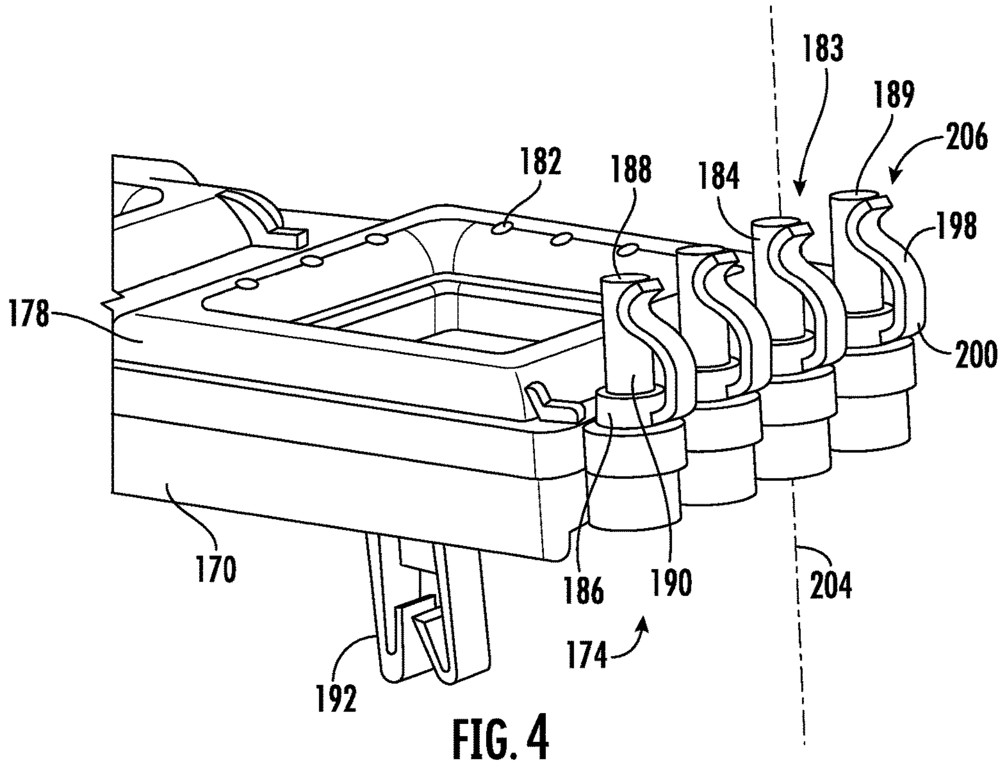
FIG. 4 provides an enlarged view of the second end of the base of FIG. 3.
Figure 5:
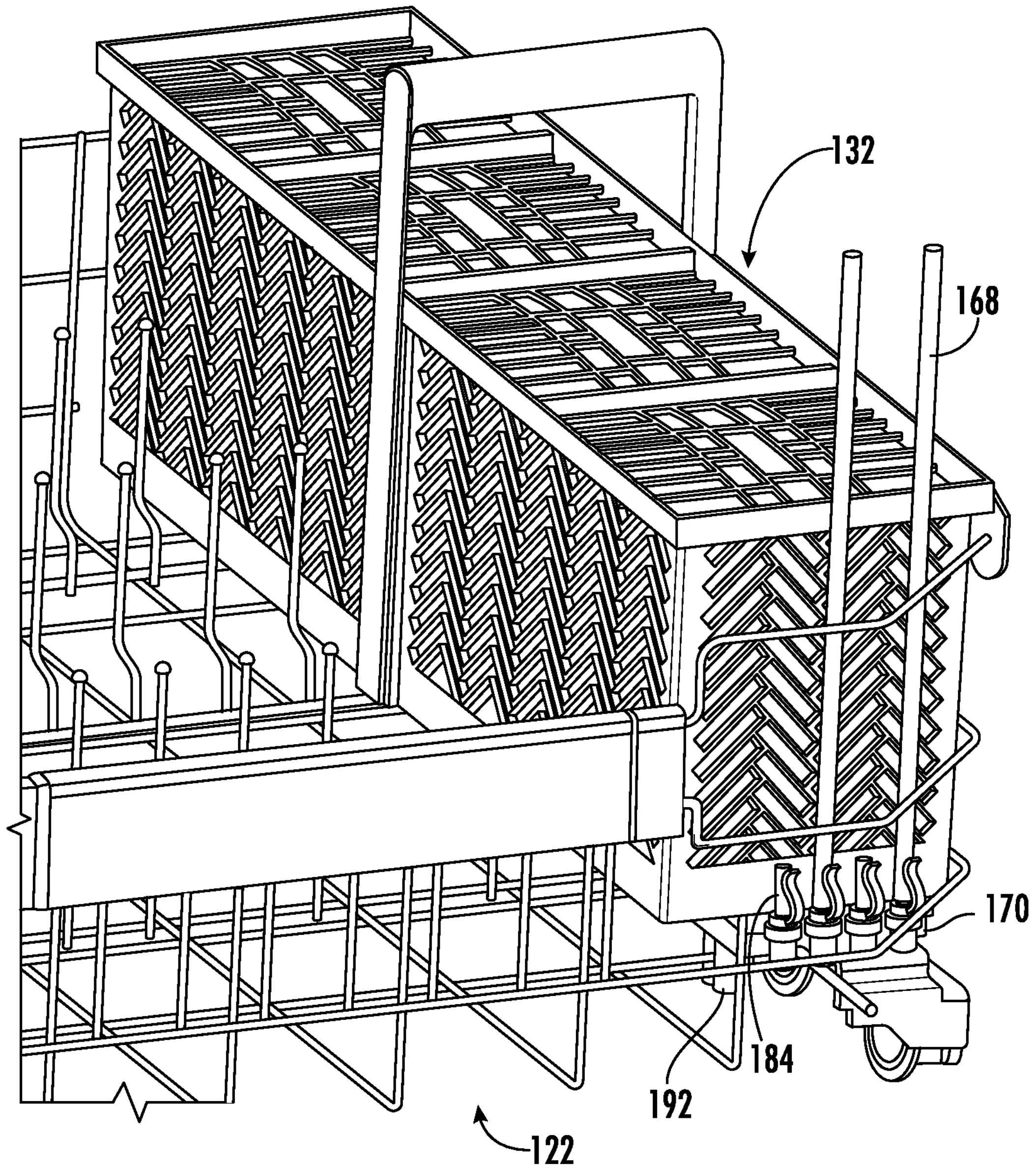
FIG. 5 provides a perspective view of a rack assembly with an attached wash assembly in accordance with an embodiment of the present invention.

As illustrated in FIG. 5, an optional silverware basket 132 may be supported by a portion of base 170 which may provide a flow of pressurized wash fluid through orifices 182 (FIGS. 3 and 4). According to another embodiment, dedicated wash assemblies 183 with nozzles 184 may be provided at the second end 174 of base 170 for cleaning tubular articles 168, such as reusable straws. In particular, the wash assemblies 183 retain the tubular article 168 having an inner passage and introduce a stream of wash fluid to the inner passage. The nozzles 184 are in fluid communication with the passageways 178 and receive the flow of pressurized wash fluid from the pump 152. Additionally or alternatively, other spray assemblies may be provided. One skilled in the art will appreciate that the embodiments discussed herein are used for the purpose of explanation only and are not limitations of the present subject matter.

In operation, pump 152 draws wash fluid in from sump 138, pressurizes the fluid, and pumps it to a diverter assembly 156, e.g., which is positioned within sump 138 of dishwasher appliance. Diverter assembly 156 may include a diverter disk (not shown) disposed within a diverter chamber 158 for selectively distributing the pressurized wash fluid to the spray arm assemblies 134, 140, 142 and/or other spray manifolds or devices. For example, the diverter disk may have a plurality of apertures that are configured to align with one or more outlet ports (not shown) at the top of diverter chamber 158. In this manner, the diverter disk may be selectively rotated to provide wash fluid to the desired spray device.

According to an exemplary embodiment, diverter assembly 156 is configured for selectively distributing the flow of pressurized wash fluid from pump 152 to various fluid supply conduits, only some of which are illustrated in FIG. 2 for clarity. More specifically, diverter assembly 156 may include four outlet ports (not shown) for supplying pressurized wash fluid to a first conduit for rotating lower spray arm assembly 134, a second conduit for rotating mid-level spray arm assembly 140, a third conduit for spraying upper spray assembly 142, and the fourth to a network of passageways 178 to supply orifices 182 and nozzles 184 with pressurized wash fluid. According to some embodiments, the pump 152 and the supply conduits directing the pressurized flow of wash fluid to the nozzles 184 produce a stream of wash fluid at the nozzle extending about 8 to 16 inches from the nozzle outlet 189, or about 10 to 14 inches from the nozzle outlet, or about 12 inches from the nozzle outlet 189. The nozzle 184 directs the pressurized flow of wash fluid generally parallel to nozzle axis 204 (FIG. 4). In use, the nozzle introduces a stream of wash fluid to an inner passage of the tubular article 168.

The dishwasher 100 is further equipped with a controller 160 to regulate operation of the dishwasher 100. The controller 160 may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 160 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 160 may be positioned in a variety of locations throughout dishwasher 100. In the illustrated embodiment, the controller 160 may be located within a control panel area 162 of door 116 as shown in FIGS. 1 and 2. In such an embodiment, input/output ("I/O") signals may be routed between the control system and various operational components of dishwasher 100 along wiring harnesses that may be routed through the bottom of door 116. Typically, the controller 160 includes a user interface panel/controls 164 through which a user may select various operational features and modes and monitor progress of the dishwasher 100. In one embodiment, the user interface 164 may represent a general purpose I/O ("GPIO") device or functional block. In one embodiment, the user interface 164 may include input components, such as one or more of a variety of electrical, mechanical or electro-mechanical input devices including rotary dials, push buttons, and touch pads.

The user interface 164 may include a display component, such as a digital or analog display device designed to provide operational feedback to a user. The user interface 164 may be in communication with the controller 160 via one or more signal lines or shared communication busses.

It should be appreciated that the invention is not limited to any particular style, model, or configuration of dishwasher 100. The exemplary embodiment depicted in FIGS. 1 and 2 is for illustrative purposes only. For example, different locations may be provided for user interface 164, different configurations may be provided for rack assemblies 122, 124, 126, different spray arm assemblies 134, 140, 142 and spray manifold configurations may be used, and other differences may be applied while remaining within the scope of the present subject matter.

In the exemplary example illustrated in FIG. 3, base 170 is a generally rectangular structure defining fluid passageways 178 arranged in an interconnected network comprising pairs of elongate rails 194, generally parallel to each other, connected by cross pieces 196. Other embodiments include other configurations of defined fluid passageways. One or more attachment devices or clips 192 may be provided to secure the base 170 to the rack assembly 122 such that the nozzle axis 204 is generally parallel with the vertical direction V. As illustrated, the clips 192 are provided on the bottom surface of the base 170. In other embodiments, the clips 192 may be positioned at other locations on the base 170, for example on the sides corresponding to the rails 194 or cross piece 196. The clips 192 are configured to removably affix the base 170 to a rack assembly, for example lower rack assembly 122. Clips 192 may be provided to affix the base to the middle and upper rack assemblies 124, 126.

Returning to FIG. 4, wash assemblies 183, including nozzles 184 are shown at second end 174 of base 170 for ease of illustration. Additionally or alternatively, nozzles 184 may be located at first end 172, or at any other portion of the base 170 in fluid communication with passageways 178. Four nozzles 184 are illustrated for convenience. In other embodiments more or fewer nozzles may be included. Nozzles 184 may be formed with base 170 or may be separately formed and attached to the base and fluidly coupled to the passageways. The nozzles may be attached to the base either individually or as a multi-nozzle block or manifold.

As mentioned above, the nozzles 184 may be provided as a dedicated source of pressurized wash fluid for cleaning tubular articles 168, such as durable, reusable straws, particularly the inside surface or such articles. As such, the illustrative nozzles 184 comprise a proximal end 186 adjacent to the base 170 and a distal end 188 spaced from the proximal end 186. The distal end 188 includes an orifice providing a nozzle outlet 189. In the illustrative embodiment of FIG. 4, the nozzle 184 has a generally tubular body, body 190 extending from the proximal end 186 to the distal end 188 and configured to be received within an inner passage, for example the inner passage of a tubular body or straw. In general, the body 190 may be formed from a durable material which may be pliant, for example comprising a natural or synthetic elastomer or elastomeric compound, or rigid, for example a plastic or metal.

In some embodiments, the body 190 may be tapered from the distal end 188 to the proximal end 186. In other words, the outer surface of the body 190 may be tapered radially outward from the free or distal end 188 to the proximal end 186, proximate to the base 170. The taper may be gradual or stepped such that a plurality of tubular articles 168 of different internal dimensions may fit on the body 190. The internal dimension may be a diameter or may be other internal dimensions depending on the tubular configuration (e.g., oval or rectangular).

According to some embodiments, a retainer system 206 may be provided to removably secure the tubular article 168 to the wash assembly 183, for example to resist the force of the pressurize wash fluid directed to the inside surfaces of the tubular articles 168. The retainer system 206 may comprise the nozzle 184 alone, the body 190 sized and shaped to cooperate with one or more sizes of tubular articles 168, or the retainer system 206 may include additional components.

In some embodiments of a retainer system 206, at least the outer surface of the body 190 comprises an elastomer that may deform when the nozzle body 190 is received in the tubular article 168 (i.e., the tubular article is placed over the nozzle 184). As such, the body 190 may engage the tubular article 168 to provide support and may form a seal with the inner wall of the tubular article 168. As discussed above, a portion of the body 190 may be radially tapered, increasing in diameter from the distal end 188 to the proximal end 186. As such, the body 190 may engage and support smaller diameter tubular articles 168 at the distal end 188 as part of a retainer system 206. Progressively large tubular articles 168 may engage and be retained by portions of the body 190 lower on the body 190 (i.e. closer to the proximal end 186). In other embodiments, the tubular article 168 may fit loosely on the body 190 and may utilize additional components to secure the tubular article 168 to the wash assembly 183.

In other embodiments of a retainer system 206, wash assembly 183 may include a retention clip 198 provided to removably secure the tubular article 168 to the nozzle 184. In the illustrative embodiment of FIGS. 4 and 5, retention clip 198 comprises a first or proximal end 200 secured to the nozzle 184 against displacement with respect to the nozzle 184. The retention clip 198 further comprises a second end 202 resiliently deformable from a first position in which the second end 202 is proximate to the distal end 188 of the body 190 and a second position in which the second end is spaced apart from the distal end 188 of the body 190. In the second position, the second end 202 is resiliently deformed in a generally radial direction from the first position. Resiliently deforming the second end 202 from the first position to the second position forms a variable gap between the second end 202 and the nozzle body 190. In use, the second end 202 of the retention clip 198 is resiliently deformed away from the body 190 to allow the tubular article 168 to be disposed over the body 190. The second end 202 of the retention clip 198 returns to its original position to removably secure the tubular article 168 to the body 190.

The above-described retainer systems 206 are examples of suitable systems for retaining a tubular article 168 on the wash assembly 183, provided as examples and not limitations. Other retainer systems may be used within the scope of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A dishwasher appliance defining a vertical direction, a lateral direction, and a transverse direction, the vertical, lateral, and transverse directions being mutually perpendicular, the dishwasher appliance comprising:

a tub defining a wash chamber;

a rack mounted within the wash chamber and configured for receipt of articles for cleaning; and a wash assembly for retaining a tubular article having an inner passage and introducing a stream of wash fluid to said inner passage, the wash assembly comprising:

a base defining a conduit, the conduit having a first end and a second end;

a nozzle fluidly coupled to the second end of the conduit, the nozzle configured to be received within the inner passage; and a retainer system to removably secure the tubular article to the wash assembly; and wherein the conduit provides a pressurized flow of a wash fluid to the nozzle.

2. The dishwasher appliance of claim 1, wherein the rack is supported for sliding motion between a first position in which the rack is fully retracted within the wash chamber and a second position in which the rack extends at least partially from the wash chamber.

3. The dishwasher appliance of claim 2, wherein:

the nozzle defines a nozzle axis; and the base is affixed to the rack such that the nozzle axis is generally parallel to the vertical direction.

4. The dishwasher appliance of claim 3, wherein the first end of the conduit is in fluid communication with a source of the pressurized flow of wash fluid at least when the rack is in the first position.

5. The dishwasher appliance of claim 4, wherein a pump provides the pressurized flow to the nozzle and the nozzle directs the pressurized flow generally parallel to the nozzle axis.

6. The dishwasher appliance of claim 5, wherein the pressurized flow produces a stream of wash fluid extending about 12 inches from a nozzle outlet.

7. The dishwasher appliance of claim 1, wherein:

the nozzle comprises a proximal end adjacent to the base and a distal end spaced from the proximal end; and the retainer system includes a retention clip at the nozzle, the retention clip configured to removably secure the tubular article to the nozzle.

8. The dishwasher appliance of claim 7, wherein the retention clip comprises:

a first end secured against displacement with respect to the nozzle; and a second end resiliently deformable from a first position proximate to the distal end and a second position spaced apart from the distal end.

9. The dishwasher appliance of claim 8, wherein, in the second position, the second end is resiliently deformed in a generally radial direction from the first position.

10. The dishwasher appliance of claim 9, wherein resiliently deforming the second end from the first position to the second position forms a variable gap between the second end and the nozzle.

11. The dishwasher appliance of claim 1, further comprising a plurality of nozzles fluidly coupled to the conduit.

12. The dishwasher appliance of claim 1, wherein the nozzle comprises a proximal end adjacent to the base, a distal end spaced from the proximal end, and an outer surface, the outer surface tapering radially outward from the distal end to the proximal end.

13. A wash assembly for retaining a tubular article having an inner passage and introducing a stream of wash fluid to said inner passage, the wash assembly comprising:

a base defining a conduit, the conduit having a first end and a second end;

a nozzle fluidly coupled to the second end of the conduit, the nozzle configured to be received within the inner passage; and a retainer system to removably secure the tubular article to the wash assembly; and wherein the conduit is adapted to provide a pressurized flow of a wash fluid to the nozzle.

14. The wash assembly of claim 13, wherein:

the nozzle comprises a proximal end adjacent to the base and a distal end spaced from the proximal end; and the retainer system further comprises a retention clip at the nozzle, the retention clip configured to removably secure the tubular article to the nozzle.

15. The wash assembly of claim 14, wherein the retention clip comprises:

a first end secured against displacement with respect to the nozzle; and a second end resiliently deformable from a first position proximate to the distal end and a second position spaced apart from the distal end.

16. The wash assembly of claim 15, wherein, in the second position, the second end is resiliently deformed in a generally radial direction from the first position.

17. The wash assembly of claim 16, wherein resiliently deforming the second end from the first position to the second position forms a variable gap between the second end and the nozzle.

18. The wash assembly of claim 13, further comprising a plurality of nozzles fluidly coupled to the conduit.

19. The wash assembly of claim 13, wherein the nozzle comprises a proximal end adjacent to the base, a distal end spaced from the proximal end, and an outer surface, the outer surface tapering radially outward from the distal end to the proximal end.

20. The wash assembly of claim 19, wherein the outer surface comprises an elastomer.

* * * * *